United States Patent
Hou et al.

(10) Patent No.: US 8,957,841 B2
(45) Date of Patent: Feb. 17, 2015

(54) LIQUID CRYSTAL DISPLAY

(75) Inventors: Hung-lung Hou, Shenzhen (CN); Cheng-ming He, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 299 days.

(21) Appl. No.: 13/375,224

(22) PCT Filed: Oct. 11, 2011

(86) PCT No.: PCT/CN2011/080657
§ 371 (c)(1),
(2), (4) Date: Nov. 29, 2011

(87) PCT Pub. No.: WO2013/026226
PCT Pub. Date: Feb. 28, 2013

(65) Prior Publication Data
US 2013/0044143 A1    Feb. 21, 2013

(30) Foreign Application Priority Data
Aug. 19, 2011    (CN) .......................... 2011 1 0239907

(51) Int. Cl.
*G09G 3/36* (2006.01)
*G09G 3/00* (2006.01)
*H04N 13/04* (2006.01)

(52) U.S. Cl.
CPC .............. *G09G 3/003* (2013.01); *G09G 3/3648* (2013.01); *G09G 3/3659* (2013.01); *H04N 13/0434* (2013.01); *G09G 2300/0447* (2013.01); *G09G 2300/0814* (2013.01); *G09G 2300/0852* (2013.01); *G09G 2310/067* (2013.01); *G09G 2320/0209* (2013.01)
USPC ................................ 345/89; 345/690; 348/58

(58) Field of Classification Search
CPC .................... G09G 3/3659; G09G 2300/0443; G09G 2300/0447; G09G 2300/0809; G09G 2320/0209; H04N 13/0434
USPC ........................... 345/690, 89, 88, 92; 348/58
See application file for complete search history.

(56) References Cited

U.S. PATENT DOCUMENTS

| | | | | |
|---|---|---|---|---|
| 7,443,466 | B2 * | 10/2008 | Dedene et al. | 349/106 |
| 7,847,773 | B2 * | 12/2010 | Chiang et al. | 345/93 |
| 2011/0216177 | A1 * | 9/2011 | Chae et al. | 348/57 |

FOREIGN PATENT DOCUMENTS

CN    102081911 B  *  4/2013

* cited by examiner

*Primary Examiner* — Chanh Nguyen
*Assistant Examiner* — John Kirkpatrick

(57) ABSTRACT

A liquid crystal display includes a TFT-LCD module which comprises a pixel for showing grayscale signal, a data line, and a first switching unit for controlling operation of the pixel. The pixel includes a main sub-pixel and a secondary sub-pixel. The TFT-LCD module further includes a pair of pixel capacitors and a second switching unit. The sub-pixel comprises a first sub-pixel and a second sub-pixel, and the TFT-LCD module further comprises a third switching unit for controlling operation of the second sub-pixel. The present invention can reduce crosstalk when showing a 3D image and keep the brightness of 2D images by controlling the operation of the second sub-pixel.

6 Claims, 8 Drawing Sheets

LIQUID CRYSTAL DISPLAY

BACKGROUND OF THE INVENTION

1. Field of the Invention

The present invention relates to a liquid crystal display (LCD), and more particularly, to an LCD capable of reducing crosstalk between pixels without degrading the quality of two-dimensional (2D) images shown on the LCD screen.

2. Description of the Prior Art

With a development of three-dimensional (3D) technology, people have more interest in seeing 3D movies by wearing 3D display devices. FIG. 1 shows a cross-section view of a common 3D LCD glasses. The 3D LCD comprises a thin film transistor-liquid crystal display (TFT-LCD) module 110 and a phase retarder 120. The TFT-LCD module 110 comprises a TFT substrate 111. A color filter (CF) substrate 130 is disposed between the TFT-LCD module 110 and the phase retarder 120. A transparent TFT circuit is disposed on the TFT substrate 111. The CF substrate 130 comprises multiple colorful green units constituting the three primary colors, red, green, and blue (RGB). Pixel signals on the 3D LCD panel form a cycle of a right-eye signal and a left-eye signal from top to bottom. In this way, a ray signal displayed on the display device can be received into the human eye in a method of horizontal stripes interweaved at intervals, as shown in FIG. 2.

The phase retarder 120 is fixed in front of the TFT-LCD module 110. The right eye and the left eye obtain different phase compensation values through a phase arrangement of the phase retarder 120 depending on the cycle of the right-eye and left-eye signals from top to bottom which is formed by the pixel signals, causing the right-eye and left-eye signals having the same vertical polarization output by the TFT-LCD module 110 to be transformed into the right-eye and left-eye signals having different polarized light. As shown in FIG. 1, if the TFT-LCD module 110 outputs vertically polarized right-eye and left-eye signals, the right-eye pixel signal becomes horizontally polarized after passing through a half-wave plate while the left-eye pixel signal remains vertically polarized after passing through a zero-wave plate. Further, the right-eye and left-eye signals can be distinguished with a pair of polarized glasses.

However, this design has a defect as shown in FIG. 1. The defect is that, there is a limit to observation at a large vertical viewing angle. The viewing angle cannot exceed ±θ1. Once the viewing angle exceeds ±θ1, the left-eye pixel signal transmits the half-wave plate and the right-eye pixel signal transmits the zero-wave plate. Thus, in addition to the left-eye signal detected through a left-eye vertical polarizer, the vertical right-eye signal is detected after the right-eye pixel signal at the large viewing angle passes through the zero-wave plate. And in addition to the right-eye signal detected through a right-eye horizontal polarizer, the horizontal left-eye signal is detected after the left-eye pixel signal at the large viewing angle passes through the half-wave plate. Accordingly, crosstalk occurs; that is, a dragging phenomenon is generated in a high contrast screen.

As shown in FIG. 3, another method of reducing crosstalk between pixels in the LCD is designing a black matrix on the CF substrate 130. A diameter a of the half-wave plate and of the zero-wave plate can be shortened to a usable diameter b. Thus, the angle of the right-eye and left-eye signals at a large viewing angle increases through the corresponding phase retarder 120, thereby increasing a viewing angle without generating crosstalk. However, the black matrix on the CF substrate 130 causes the brightness of 2D images shown on the LCD screen to decrease when a viewer views the 2D images.

As shown in FIGS. 4 and 5, another method of reducing crosstalk between pixels in the LCD is changing the illumination scope of pixels. The details are as follows: two data lines or two scan lines are used to control grayscale signal and black image signal of the pixel signals independently, so that the grayscale signal and the black image signal can be shown at intervals. Since the pixel signals output by the TFT-LCD module 110 have the black image signal, the duration of viewing the right-eye signal or the left-eye signal at a large viewing angle increases, reducing crosstalk between the adjacent pixels.

But the above-mentioned method has two defects: the cost of driver chips suffers the increase because double data lines or scan lines are used; the method is not suitable for the charging sharing (CS) model in which a main sub-pixel area is distinguished from a sub-pixel area through the charge and discharge of a capacitor. As shown in FIG. 6, a main sub-pixel 620 and a secondary sub-pixel 630 are connected to different pixel capacitors (not shown), so voltage applied to the main sub-pixel 620 and to the secondary sub-pixel 630 is determined differently in the CS mode. Under the condition of a fixed pixel capacitor, the main sub-pixel 620 and the secondary sub-pixel 630 form a specific relation between the voltages across them. When the pixel is on a high-level grayscale, the main sub-pixel 620 shows a primary grayscale signal and the secondary sub-pixel 630 shows a secondary grayscale signal (there is a ratio between the secondary grayscale signal and the primary grayscale signal). The secondary sub-pixel 630, instead of keeping black, becomes brighter, which hinders a real black image signal from being generated when the LCD shows 3D images.

As such, it is a considerable need for an LCD to resolve the above-mentioned problems.

SUMMARY OF THE INVENTION

Therefore, it is an object of the present invention to provide an LCD for overcoming the crosstalk phenomenon which occurs easily when a viewer views 3D images using conventional LCDs, or for resolving the reduction in brightness when a viewer views 2D images using conventional LCDs.

To resolve the abovementioned problems, the present invention adopts the following schemes:

A liquid crystal display (LCD), comprising a TFT-LCD module which comprises a pixel for showing grayscale signal, a data line for transmitting a data signal to the pixel, and a first switching unit for controlling operation of the pixel; the pixel comprising a main sub-pixel and a secondary sub-pixel, and the TFT-LCD module further comprising: a pair of pixel capacitors for reallocating voltage of the grayscale signal to the main sub-pixel and to the secondary sub-pixel in the same frame, and a second switching unit for controlling the reallocation. The sub-pixel comprises a first sub-pixel and a number of n second sub-pixels, and the TFT-LCD module further comprises a number of n third switching units for controlling operation of each corresponding second sub-pixel, where n is an integrate greater than 1. The TFT-LCD module further comprises a control unit for controlling the conduction of the third switching unit depending on the data signal carried by the data line and an adjusting unit for adjusting a number of the third switching units controlled by the control unit. The third switching unit comprises a control end coupled to the control unit, an input end coupled to the first sub-pixel, and an output end coupled to the second sub-pixel. When the LCD displays 3D images, the data signal comprises grayscale signal and black image signal; the third switching units controlled by the control unit turn on when the black image signal is transmitted by the data line; the third switching units controlled by the control unit turn off when the grayscale signal is transmitted by the data line; the third switching units which are not controlled by the control unit keep turning on. When the LCD displays 2D images, the third switching unit turns on.

The present invention also proposes: a liquid crystal display (LCD), comprising a TFT-LCD module which comprises a pixel for showing grayscale signal, a data line for transmitting a data signal to the pixel, and a first switching unit for controlling operation of the pixel;

the pixel comprising a main sub-pixel and a secondary sub-pixel, and the TFT-LCD module further comprising: a pair of pixel capacitors for reallocating voltage of the grayscale to the main sub-pixel and to the secondary sub-pixel in the same frame, and a second switching unit for controlling the reallocation, characterized in that:

the sub-pixel comprises a first sub-pixel and a second sub-pixel, and the TFT-LCD module further comprises a third switching unit for controlling operation of the second sub-pixel.

In one aspect of the present invention, the TFT-LCD module further comprises a control unit for controlling the conduction of the third switching unit depending on the data signal carried by the data line, the control unit being connected to the control of the third switching unit, the input of the third switching unit being connected to the first sub-pixel, and the output of the third switching unit being connected to the second sub-pixel.

In one aspect of the present invention, when the LCD displays 3D images, the data signal comprises grayscale signal and black image signal; the third switching unit turns on when the black image signal is transmitted through the data line, and the third switching unit turns off when the grayscale signal is transmitted through the data line.

In one aspect of the present invention, when the LCD displays 2D images, the data signal comprises grayscale signal, and the third switching unit keep turning on.

The present invention also proposes: a liquid crystal display (LCD), comprising a TFT-LCD module which comprises a pixel for showing grayscale signal, a data line for transmitting a data signal to the pixel, and a first switching unit for controlling operation of the pixel;

the pixel comprising a main sub-pixel and a sub-pixel, and the TFT-LCD module further comprising: a pair of pixel capacitors for reallocating voltage of the grayscale signal of the main sub-pixel and voltage of the grayscale signal of the sub-pixel in the same frame, and a second switching unit for controlling the reallocation, characterized in that:

the sub-pixel comprises a first sub-pixel and a number of n second sub-pixels, and the TFT-LCD module further comprises a number of n third switching units for controlling operation of each corresponding second sub-pixel, where n is an integrate greater than 1.

In one aspect of the present invention, the TFT-LCD module further comprises: a control unit for controlling the conduction of the third switching unit depending on the data signal carried by the data line, the third switching unit comprising a control end coupled to the control unit, an input end coupled to the first sub-pixel, and an output end coupled to the second sub-pixel.

In one aspect of the present invention, when the LCD displays 3D images, the data signal comprising grayscale signal and black image signal, the third switching unit is turned on when the black image signal is transmitted through the data line, and the third switching unit is turned off when the grayscale signal is transmitted through the data line.

In one aspect of the present invention, when the LCD displays 2D images, the data signal comprises grayscale signal, and the third switching unit keep turning on.

In one aspect of the present invention, the TFT-LCD module further comprises an adjusting unit for adjusting a number of the third switching units controlled by the control unit.

In one aspect of the present invention, when the LCD displays 3D images, the data signal comprises grayscale signal and black image signal; the third switching units controlled by the control unit turn on when the black image signal is transmitted by the data line; the third switching units controlled by the control unit turn off when the grayscale signal is transmitted by the data line; the third switching units which are not controlled by the control unit keep turning on.

In order to eliminate the aforementioned problems associated with conventional LCDs, the LCD of the present invention adopts the following scheme: controlling operation of a second sub-pixel to reduce and adjust 3D crosstalk and to assure no reduction in the 2D brightness.

These and other features, aspects and advantages of the present disclosure will become understood with reference to the following description, appended claims and accompanying figures.

DETAILED DESCRIPTION OF THE PREFERRED EMBODIMENTS

Figure 1:
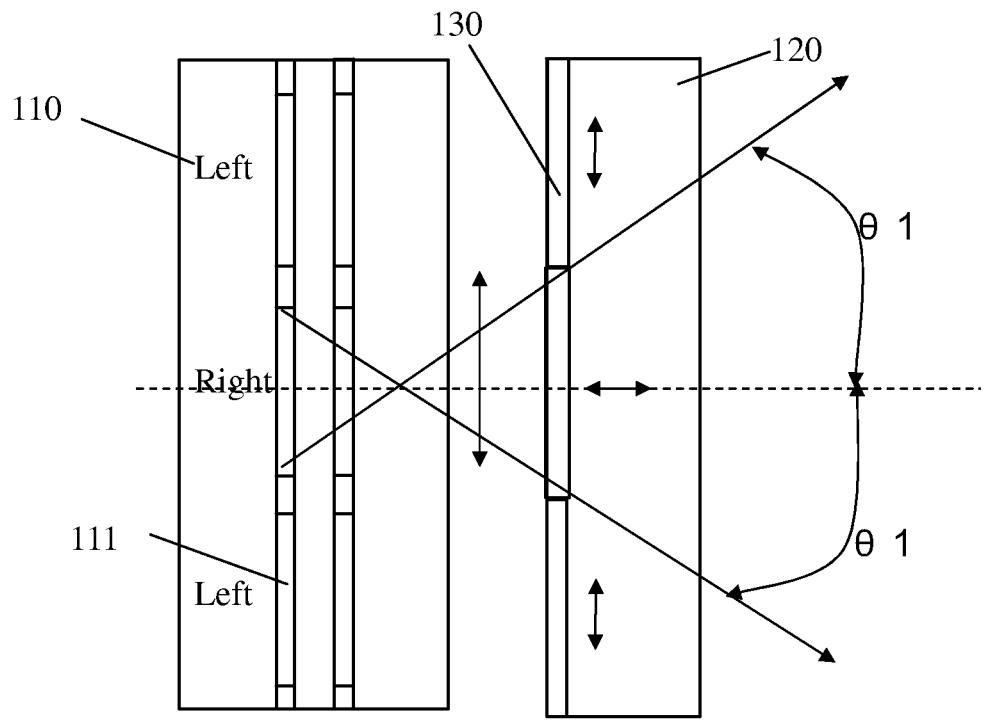
FIG. 1 shows a cross-section view of a conventional 3D LCD glasses.
Figure 2:
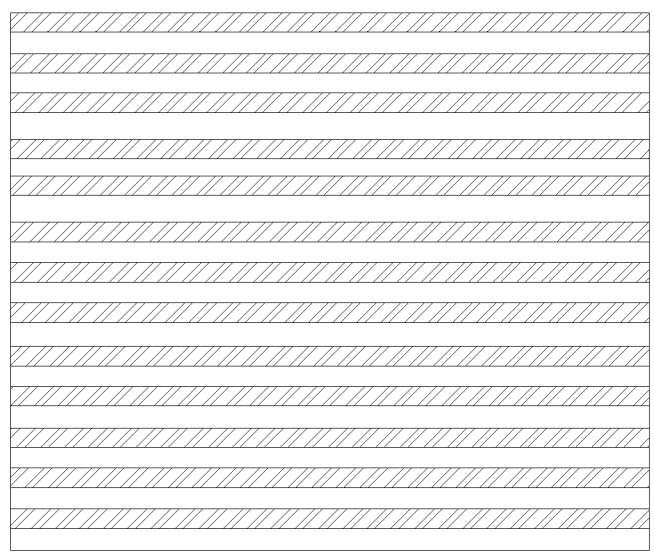
FIG. 2 shows a schematic diagram showing signals displayed on a panel of the conventional LCD.
Figure 3:
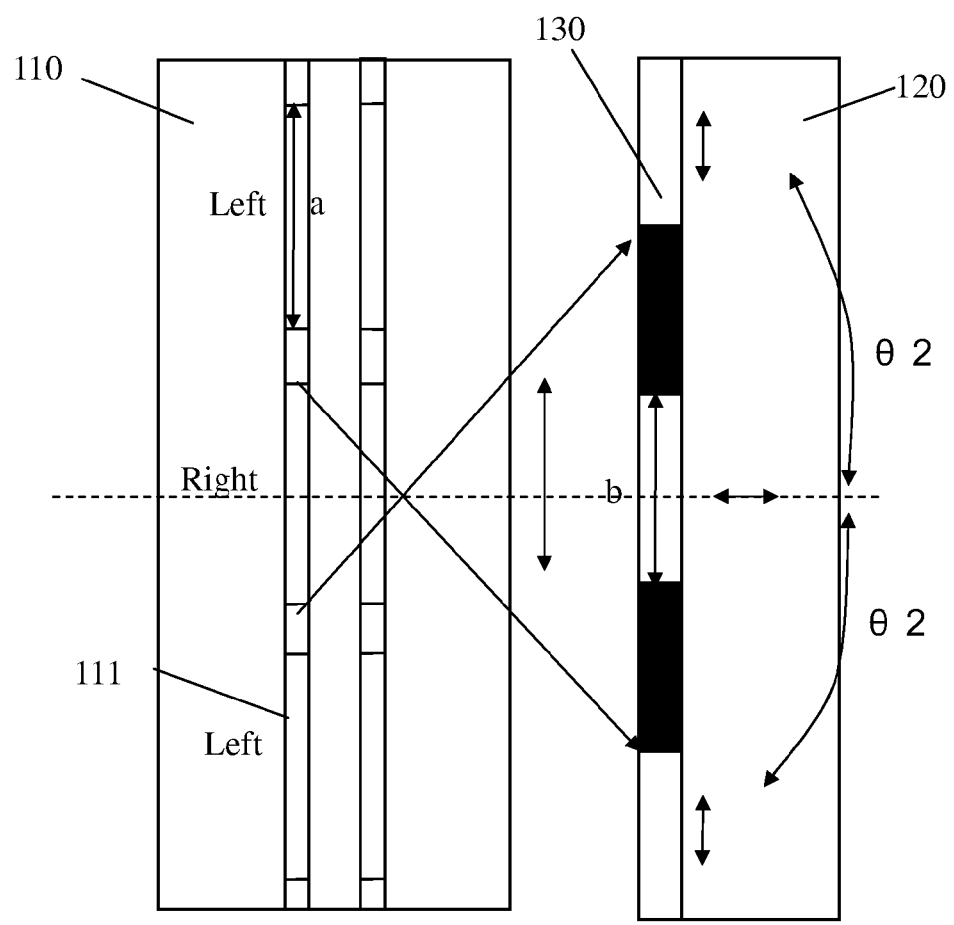
FIG. 3 shows a structure diagram of a conventional LCD having a phase retarder with a black matrix.
Figure 4:
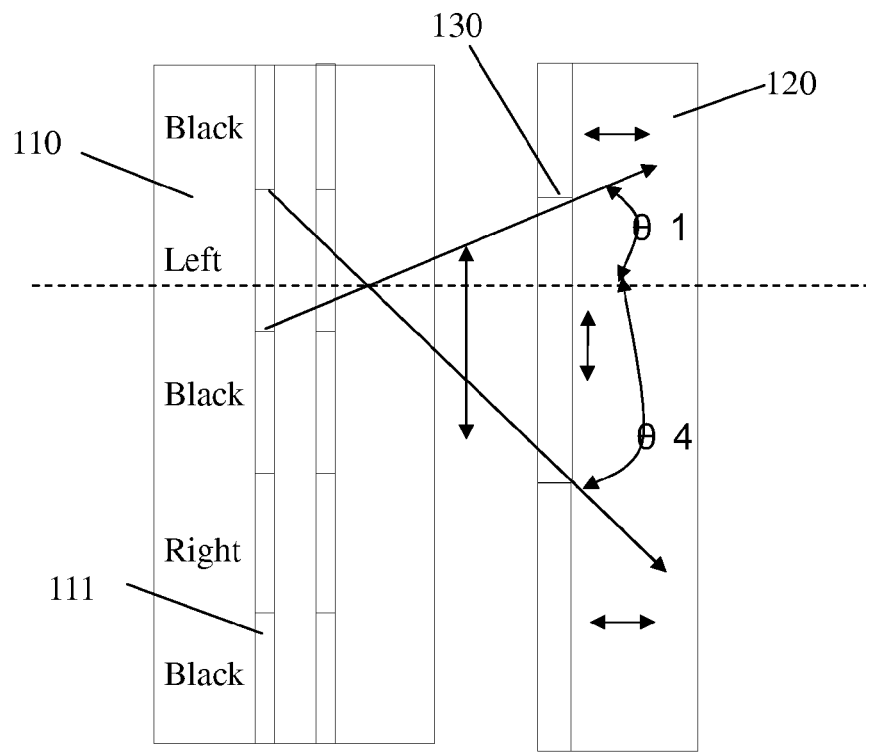
FIG. 4 shows a structure diagram of a conventional LCD on which image signal having black image signal is applied.
Figure 5:
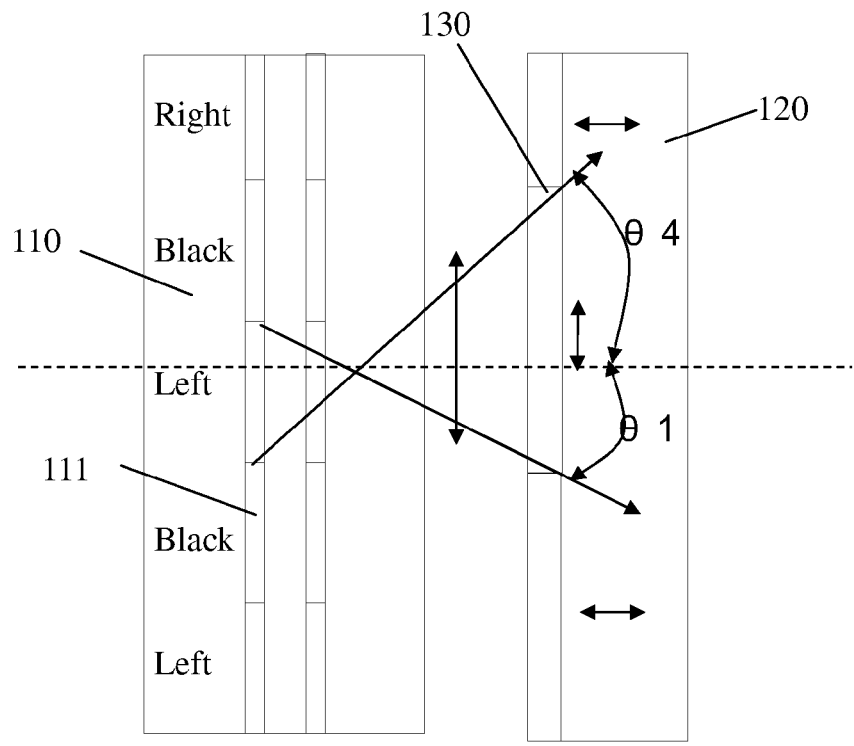
FIG. 5 shows another structure diagram of a conventional LCD on which image signal having black image signal is applied.
Figure 6:
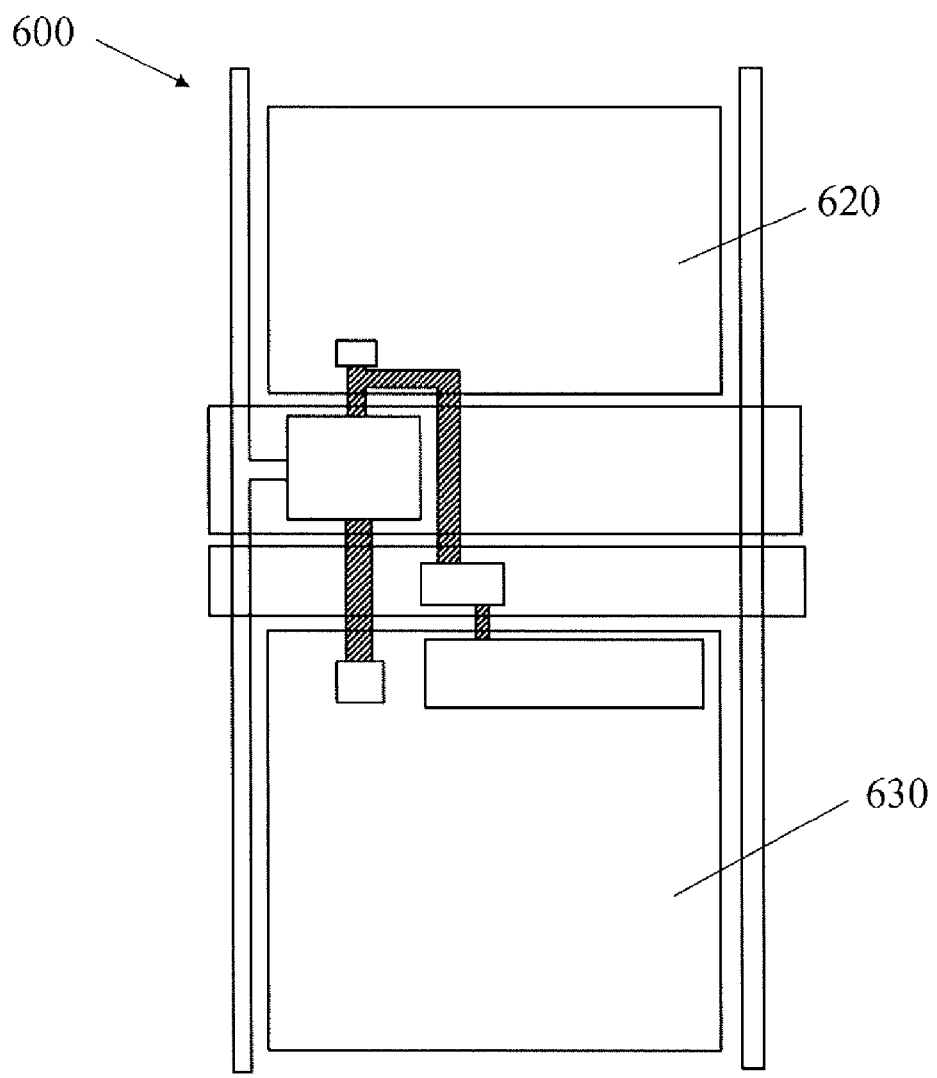
FIG. 6 shows a pixel structure using CS mode in a conventional LCD.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

In the following description, units with a similar structure will be labeled by the same reference numerals though they are shown in different drawings.

Figure 7:
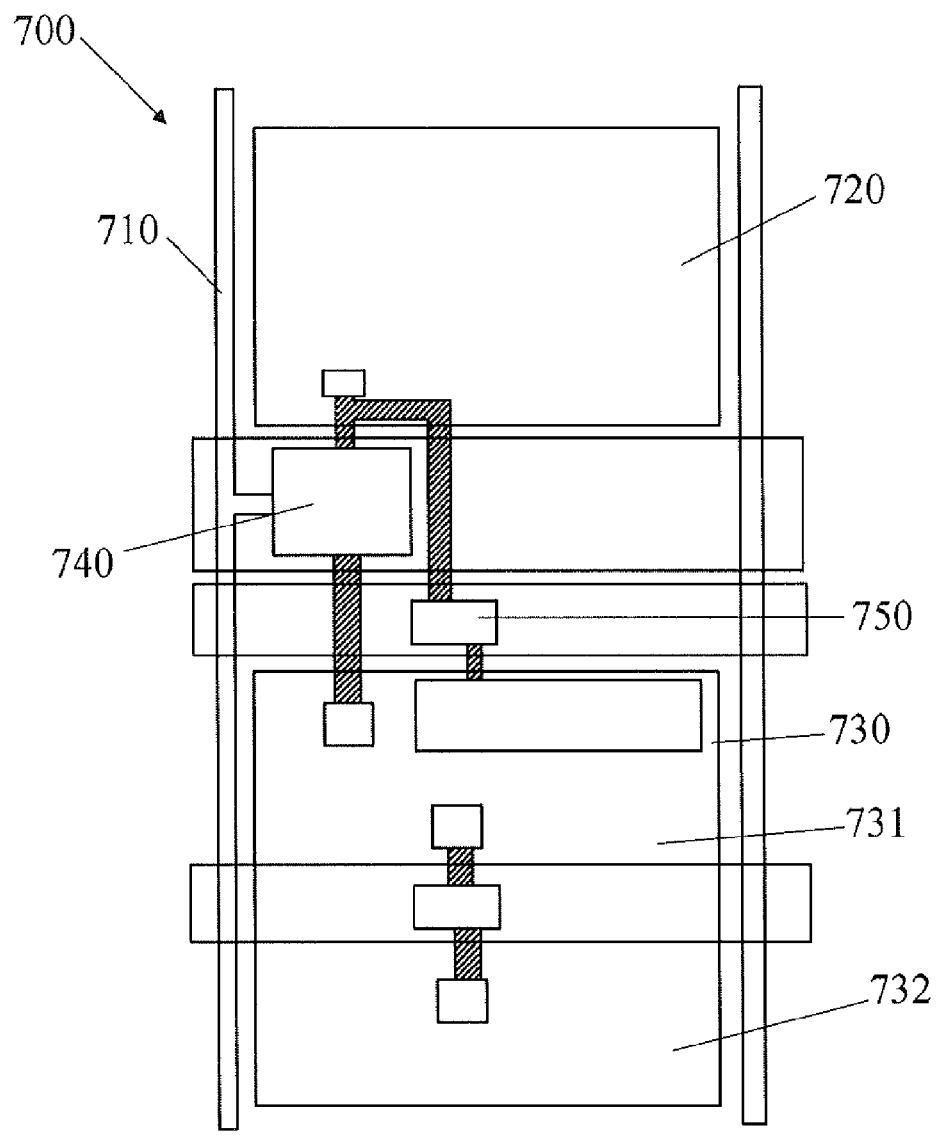
FIG. 7 shows a schematic diagram of a driving pixel in the CS mode in an LCD according to a first preferred embodiment of the present invention.

Referring to FIG. 7, FIG. 7 shows a schematic diagram of a driving pixel in the CS mode in an LCD according to a first preferred embodiment of the present invention. The LCD 700 comprises a TFT-LCD module having a pixel, a data line 710, and a first switching unit 740. The pixel is used for showing grayscale signal. The data line 710 is used for transmitting a data signal to the pixel. The first switching unit 740 is used for controlling operation of the pixel. The pixel comprises a main sub-pixel 720 and a secondary sub-pixel 730. The TFT-LCD module further comprises a pair of pixel capacitors (not shown) and a second switching unit 750. The main sub-pixel 720 and the secondary sub-pixel 730 are conducted through the pair of pixel capacitors. The potential of the main sub-pixel 720 and the potential of the secondary sub-pixel 730 are reallocated depending on the ratio of the capacitance of the pair of pixel capacitors. Finally, the main sub-pixel 720 and the secondary sub-pixel 730 form a specific relation between the voltages across them. The second switching unit 750 is used for readjusting the relation between the voltages across the main sub-pixel 720 and the secondary sub-pixel 730. The secondary sub-pixel 730 comprises a first sub-pixel 731 and a second sub-pixel 732. The TFT-LCD module further comprises a third switching unit 760 used for controlling operation of the second sub-pixel 732.

In the LCD of the present invention, a corresponding pixel is operated through the first switching unit 740. The data signal having the grayscale signal is transmitted to the pixel for display through the data line 710. The pixel is subdivided into two a main sub-pixel 720 and a secondary sub-pixel 730. A driving voltage applied to the main sub-pixel 720 and to the secondary sub-pixel 730 is allocated differently through each relevant pixel capacitor so that the main sub-pixel 720 and the secondary sub-pixel 730 can have different optical characteristics to achieve a wide viewing angle display. When the second switching unit 750 is turned on, the driving voltage applied to the main sub-pixel 720 and to the secondary sub-pixel 730 is reallocated based on the ratio of the capacitance of the pair of the pixel capacitors. To avoid crosstalk, the secondary sub-pixel 730 is subdivided into a first sub-pixel 731 and a second sub-pixel 732 again. The third switching unit 760 controls operation of the second sub-pixel 732.

Because the black image signal is not needed to avoid crosstalk occurring when the LCD 700 displays 2D images, the third switching unit 760 is turned on so that the second sub-pixel 732 can operate. The driving voltage of the grayscale signal applied on the second sub-pixel 732 and the first sub-pixel 731. In this way, the LCD 700 can display 2D images normally as the conventional LCDs do. When the LCD 700 displays 3D images, the third switching unit 760 is turned off so that the second sub-pixel 732 stops operating (that is, the grayscale signal of the second sub-pixel 732 is not applied). It is similar that the black image signal is applied on the second sub-pixel 732. Since the main sub-pixel 720 is connected to the first sub-pixel 731 via the pixel capacitor, and the second sub-pixel 732 is disconnected with the main sub-pixel 720, the black image signal will not be affected by the grayscale signal of the main sub-pixel 720. Thus, the black image signal can truly avoid crosstalk. The LCD 700 not only can effectively reduce 3D crosstalk but also does not affect the 2D brightness.

The TFT-LCD module further comprises a control unit (not shown) in the preferred first embodiment of the present invention. The control unit controls the conduction of the third switching unit 760 based on the data signal from the data line 710. The control unit is connected to the control of the third switching unit 760. The input of the third switching unit 760 is connected to the first sub-pixel 731. The output of the third switching unit 760 is connected to the second sub-pixel 732.

The control unit assures whether the third switching unit is conducted or not. The control of the third switching unit 760 is connected to the control unit. The first sub-pixel 731 is connected to the main sub-pixel 720 through the pair of the pixel capacitors, causing the grayscale signal of the first sub-pixel 731 to be affected by the grayscale signal of the main sub-pixel 720. The input of the third switching unit 760 is connected to the first sub-pixel 731, and the output thereof is connected to the second sub-pixel 732. Since the connection of the second sub-pixel 732 and the first sub-pixel 731 is controlled by the third switching unit 760, the LCD 700 will display better 2D or 3D images. In addition, the grayscale signal shown by the second sub-pixel 732 will not be affected by the grayscale signal shown by the main sub-pixel 720 when the LCD 700 displays 3D images.

As the preferred embodiment of the LCD in the present invention, the control unit controls the third switching unit 760 depending on the data signal carried by the data line 710. The details are as follows:

The data signal comprises grayscale signal and black image signal under the condition of 3D images shown on the LCD 700. The third switching unit 760 is tuned on while the data line 710 transmits the black image signal. The third switching unit 760 is turned off while the data line 710 transmits the grayscale signal.

The data signal comprises grayscale signal under the condition of 2D images shown on the LCD 700 screen. The third switching unit 760 keeps being conducted.

Figure 8:
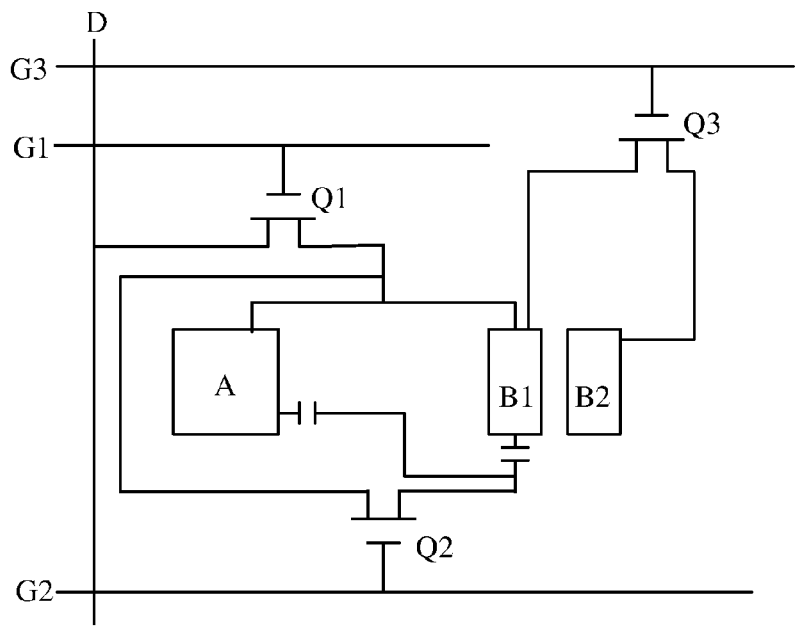
FIG. 8 shows a schematic diagram of a circuit in the CS mode in the LCD according to the preferred embodiment of the present invention.
Figure 9:
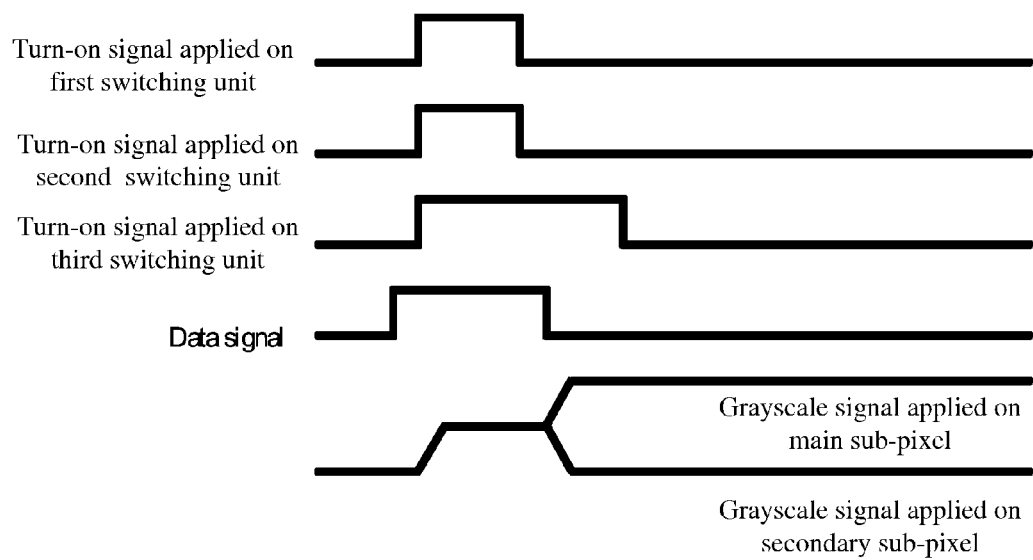
FIG. 9 is a schematic diagram showing the potential of all signals while the LCD displays 2D images according to the preferred embodiment of the present invention.

FIG. 8 shows a schematic diagram of a circuit in the CS mode in the LCD according to the preferred embodiment of the present invention. FIG. 9 is a schematic diagram showing the potential of all signals while the LCD displays 2D images according to the preferred embodiment of the present invention. No crosstalk occurs when 2D images are displayed, so the data signal has the grayscale signal, only. At this time, the third switching unit Q3 just keeps being conducted (that is, the first sub-pixel B1 and the second sub-pixel B2 keep being conducted). As shown in FIG. 9, the turn-on time of the second switching unit Q2 (controlled by a scan line G2) and the turn-on time of the first switching unit Q1 (controlled by a scan line G1) both are within the turn-on time of the signal at a high potential carried by the data line D and the turn-on time of the turn-on signal in the third switching unit Q3 (controlled by a scan line G3). It ensures that 2D images will be displayed normally. Besides, various driving voltages of the grayscale signal are generated after the grayscale signal of the main sub-pixel A and sub-pixels B1+B2 passes through the pair of pixel capacitors, which achieves a better displaying effect.

Figure 10:
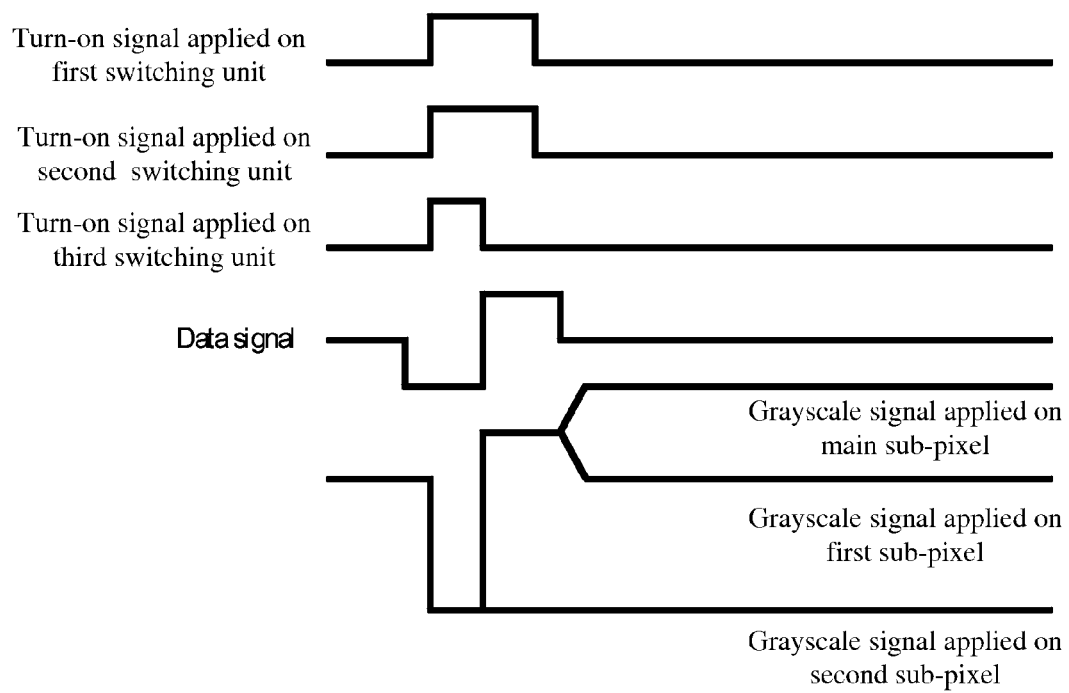
FIG. 10 is a schematic diagram showing the potential of all signals while the LCD displays 3D images according to the preferred embodiment of the present invention.

FIG. 8 shows a schematic diagram of the circuit in the CS mode in the LCD according to the preferred embodiment of the present invention. FIG. 10 is a schematic diagram showing the potential of all signals while the LCD displays 3D images according to the preferred embodiment of the present invention. When 3D images are displayed, the data signal carried by the data line D has the grayscale signal and the black image signal. The black image signal of the second sub-pixel B2 is completely black through the control of the third switching unit G3. When the data line D transmits the black image signal (that is, at a low potential), the first switching unit Q1, the second switching unit Q2, and the third switching unit Q3 all are conducted. At this time, the main sub-pixel A, the first sub-pixel B1, and the second sub-pixel B2 all are at a low potential. When the data line D transmits the grayscale signal (that is, at a high potential), the first switching unit Q1 and the second switching unit Q2 are conducted while the third switching unit Q3 is disconnected. At this time, the main sub-pixel A and the first sub-pixel B1 are transformed into being at a high potential and the second sub-pixel B2 remains at a low potential. In this way, the second sub-pixel B2 keeps at a low potential for a whole frame, the black image signal can be completely black. In other words, the second sub-pixel B2 area of the LCD is constantly in darkness. Because the distance exists between the black image signal and the grayscale signal, crosstalk is reduced.

Figure 11:
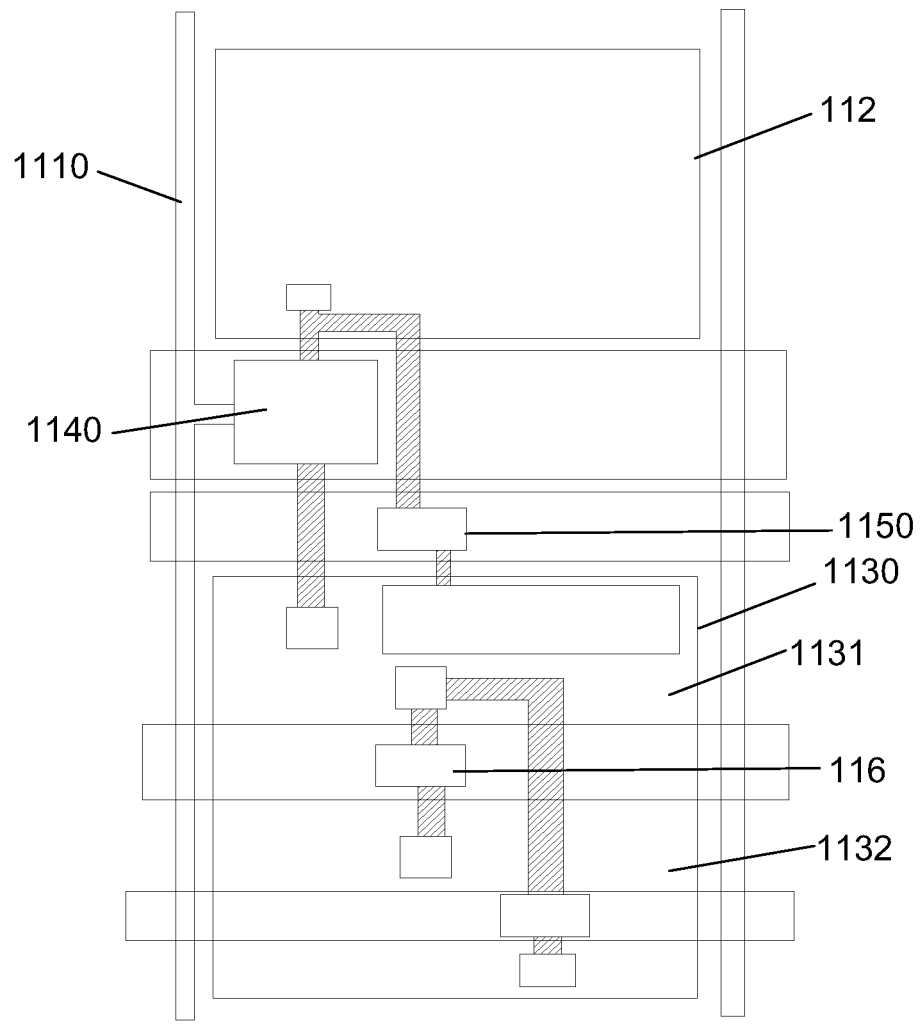
FIG. 11 shows a schematic diagram of a driving pixel in the CS mode in a second LCD according to a preferred embodiment of the present invention.

The present invention further relates to an LCD. FIG. 11 shows a schematic diagram of a driving pixel in the CS mode in a second LCD according to a preferred embodiment of the present invention. The LCD 1100 comprises a TFT-LCD module having a pixel, a data line 1110 and a first switching unit 1140. The pixel is used for displaying the grayscale signal. The data line 1110 is used for transmitting data signal to the pixel. The first switching unit 1140 is used for controlling the operation of the pixel. The pixel comprises a main sub-pixel 1120 and a secondary sub-pixel 1130. The TFT-LCD module further comprises a pair of pixel capacitor and a second switching unit 1150. Since the pair of pixel capacitors are coupled between the main sub-pixel 1120 and the secondary sub-pixel 1130, the potential applied on the main sub-pixel 1120 and the secondary sub-pixel 1130 are proportionally reallocated depending on the capacitance ratio between the pair of the pixel capacitors, thereby causing a voltage relationship between the main sub-pixel 1120 and secondary sub-pixel 1130. The voltage relationship is adjusted by the second switching unit 1150. The secondary sub-pixel 1130 comprises a first sub-pixel 1131 and a number of n second sub-pixels 1132, and the TFT-LCD module further comprises a number of n third switching units 1160 used for controlling operation of corresponding second sub-pixels 1132 where n is an integer greater than one.

To increase the 3D brightness and to reduce crosstalk between pixels, the secondary sub-pixel 1130 is subdivided into a main sub-pixel 1131 and a number of n second sub-pixels 1132 again in an LCD 1100 of the present invention. The n third switching units 1160 control operation of the corresponding second sub-pixels 1132. Such a design makes the adjustability of the LCD 1100 stronger. If 3D images are not felt bright enough by the viewer, the number of the second sub-pixels 1132 which appear dark can be reduced by controlling part of the third switching units 1160, thereby reducing the area of the black image signal and increasing the 3D brightness. If the viewer thinks that crosstalk is obviously disturbing, needing a wide viewing angle to view 3D images, the number of the second sub-pixels 1132 which appear dark (black image signal) can be increased by controlling part of the third switching units 1160, thereby increasing the area showing the black image signal and reducing crosstalk when 3D images are displayed.

The operation and the advantage of the LCD 1100 for displaying 2D and 3D image are similar to those of LCD 700, please refer to detailed embodiment of LCD 700 mentioned above.

As the preferred embodiment of the present invention, the TFT-LCD module further comprises a control unit (not shown) for controlling on/off state of the third switching unit 1160 based on the data signal from the data line 1110. The third switching unit 1160 comprises a control end coupled to the control unit, an input end coupled to the first sub-pixel 1131, and an output end coupled to the corresponding second sub-pixel 1132. When the LCD 1100 displays 3D images, data signal comprises grayscale signal and black image signal. The third switching unit 1160 turns on when the black image signal is transmitted by the data line 1110. The third switching unit 1160 turns off when the grayscale signal is transmitted by the data line 1110. When the LCD 1100 displays 2D images, the data signal only comprises the grayscale signal, and the third switching unit 1160 keeps turning on.

The operation and the advantage of the LCD 1100 for displaying 2D and 3D image are similar to those of LCD 700, please refer to detailed embodiment of LCD 700 mentioned above.

In another embodiment of the LCD, the TFT-LCD module further comprises an adjusting unit for adjusting the number of third switching units 1160 controlled by the control unit.

The adjusting unit of the LCD 1100 adjusts the number of second sub-pixels 1132 showing dark image (i.e. black image signal). When the LCD 1100 displays 3D images, data signal comprises grayscale signal and black image signal. The third switching units 1160 which are controlled by the control unit turn on when the black image signal is transmitted by the data line 1110. The third switching units 1160 which are controlled by the control unit turn off when the grayscale signal is transmitted by the data line 1110. However, the third switching units 1160 which are not controlled by the control unit keep turning on.

The second sub-pixels 1132 all are connected to the first sub-pixel 1131 through the corresponding third switching units 1160. The control unit can determine whether the second sub-pixels 1132 show the black image signal or not through the corresponding third switching units 1160. In this way, switching between 2D and 3D images is accomplished. Meanwhile, the number of third switching units 1160 controlled by the control unit can be adjusted, and the number of second sub-pixels 1132 showing the black image signal can be adjusted, too. Thus, the area of the black image signal can be adjusted when 3D images are displayed. On the condition that the 2D brightness is not affected, the relation between the 3D brightness and the viewing angle can be adjusted. At high brightness, the number of pixels showing the black image signal is increased, causing brightness to be decreased and crosstalk to be reduced; at low brightness, the number of pixels showing the black image signal is decreased, causing brightness to be increased and crosstalk to be aggravated.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD), comprising a TFT-LCD module which comprises a pixel for showing grayscale signal, a data line for transmitting a data signal to the pixel, and a first switching unit for controlling operation of the pixel;
the pixel comprising a main sub-pixel and a secondary sub-pixel, and the TFT-LCD module further comprising: a pair of pixel capacitors for reallocating a voltage of the grayscale signal to the main sub-pixel and to the secondary sub-pixel in the same frame, and a second switching unit for controlling the reallocation, characterized in that:

the secondary sub-pixel comprises a first sub-pixel and a number of n second sub-pixels, and the TFT-LCD module further comprises a number of n third switching units for controlling operation of each corresponding second sub-pixel, where n is an integer greater than 1;

the TFT-LCD module further comprises a control unit for controlling the conduction of the third switching unit depending on the data signal carried by the data line and an adjusting unit for adjusting a number of the third switching units controlled by the control unit, the third switching unit comprises a control end coupled to the control unit, an input end coupled to the first sub-pixel, and an output end coupled to the second sub-pixel;

when the LCD displays 3D images, the data signal comprises a grayscale signal and a black image signal; the third switching units controlled by the control unit turn on when the black image signal is transmitted by the data line; the third switching units controlled by the control unit turn off when the grayscale signal is transmitted by the data line; and the third switching units which are not controlled by the control unit remain turned on;

when the LCD displays 2D images, the third switching unit turns on.

2. A liquid crystal display (LCD), comprising a TFT-LCD module which comprises a pixel for showing grayscale signal, a data line for transmitting a data signal to the pixel, and a first switching unit for controlling operation of the pixel;

the pixel comprising a main sub-pixel and a secondary sub-pixel, and the TFT-LCD module further comprising: a pair of pixel capacitors for reallocating a voltage of the grayscale signal of the main sub-pixel and a voltage of the grayscale signal of the sub-pixel in the same frame, and a second switching unit for controlling the reallocation, characterized in that:

the secondary sub-pixel comprises a first sub-pixel and a number of n second sub-pixels, and the TFT-LCD module further comprises a number of n third switching units for controlling operation of each corresponding second sub-pixel, where n is an integer greater than 1, and the TFT-LCD module further comprises: a control unit for controlling the conduction of the third switching unit depending on the data signal carried by the data line, the third switching unit comprising a control end coupled to the control unit, an input end directly coupled to the first sub-pixel, and an output end coupled to the second sub-pixel, the TFT-LCD module further comprises: an adjusting unit for adjusting a number of the third switching units controlled by the control unit.

3. The LCD of claim 2, characterized in that: when the LCD displays 3D images, the data signal comprising grayscale signal and black image signal, the third switching unit is turned on when the black image signal is transmitted through the data line, and the third switching unit is turned off when the grayscale signal is transmitted through the data line.

4. The LCD of claim 2, characterized in that: when the LCD displays 2D images, the data signal comprises grayscale signal, and the third switching unit keep turning on.

5. The LCD of claim 2, characterized in that: when the LCD displays 3D images, the data signal comprises grayscale signal and black image signal; the third switching units controlled by the control unit turn on when the black image signal is transmitted by the data line; the third switching units controlled by the control unit turn off when the grayscale signal is transmitted by the data line; and the third switching units which are not controlled by the control unit remain turned on.

6. The LCD of claim 2, characterized in that: when the LCD displays 2D images, the third switching unit turns on.

* * * * *